United States Patent
Singh et al.

(10) Patent No.: US 10,623,308 B2
(45) Date of Patent: Apr. 14, 2020

(54) FLOW ROUTING SYSTEM

(71) Applicant: Dell Products L.P., Round Rock, TX (US)

(72) Inventors: Ankit Singh, Karnataka (IN); Shrikant U. Hallur, Bangalore (IN); Rohit Kumar Arehalli, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 15/436,431

(22) Filed: Feb. 17, 2017

(65) Prior Publication Data

US 2018/0241664 A1 Aug. 23, 2018

(51) Int. Cl.
  *H04L 12/721* (2013.01)
  *H04L 29/06* (2006.01)
  *H04L 12/741* (2013.01)
  *H04L 12/715* (2013.01)

(52) U.S. Cl.
  CPC .......... *H04L 45/38* (2013.01); *H04L 63/105* (2013.01); *H04L 69/22* (2013.01); *H04L 45/64* (2013.01); *H04L 45/745* (2013.01)

(58) Field of Classification Search
  CPC ........ H04L 45/38; H04L 45/745; H04L 69/22
  See application file for complete search history.

(56) References Cited

U.S. PATENT DOCUMENTS

| | | | |
|---|---|---|---|
| 9,264,400 B1* | 2/2016 | Lin | H04L 63/0245 |
| 9,634,938 B2* | 4/2017 | Agarwal | H04L 47/122 |
| 2007/0192543 A1* | 8/2007 | Naik | G06F 12/0891 |
| | | | 711/133 |
| 2012/0221590 A1* | 8/2012 | Liu | H04L 29/06 |
| | | | 707/758 |
| 2012/0243539 A1* | 9/2012 | Keesara | H04L 45/66 |
| | | | 370/392 |
| 2014/0016501 A1* | 1/2014 | Kamath | H04L 69/22 |
| | | | 370/253 |
| 2014/0233385 A1* | 8/2014 | Beliveau | H04L 47/122 |
| | | | 370/235 |

(Continued)

OTHER PUBLICATIONS

Ivan Pepelnjak, "Optimizing OpenFlow Hardware Tables << ipSpace.net by @ioshints," May 13, 2014, 3 pages, ipSpace, http://blog.ipspace.net/2014/05/optimizing-openflow-hardware-tables.html.

*Primary Examiner* — Peter P Chau
(74) *Attorney, Agent, or Firm* — Haynes and Boone, LLP

(57) ABSTRACT

A flow routing system includes a source device and a destination device that are coupled together via a network that includes a Software Defined Networking (SDN) device. The source device generates a packet that includes a packet header, provides a connection identifier in the packet header, and transmits the packet through the network. The SDN device receives the packet through the network from the source device, matches the connection identifier that is included in the packet header to a single tuple in a flow entry of a flow table and, in response, uses the flow entry to route the packet through the network to the destination device. The connection identifier may be provided by hashing a source IP address, a destination IP address, a VLAN identity, a source MAC address, a source port identifier, a destination port identifier; and a creation time for the flow including the packet.

17 Claims, 6 Drawing Sheets

(56) References Cited

U.S. PATENT DOCUMENTS

| | | | |
|---|---|---|---|
| 2014/0328350 A1* | 11/2014 | Hao | H04L 47/80 370/401 |
| 2014/0341029 A1* | 11/2014 | Allan | H04L 47/125 370/235 |
| 2015/0117455 A1* | 4/2015 | Umesh | H04L 45/38 370/392 |
| 2015/0312142 A1* | 10/2015 | Barabash | H04L 45/42 370/400 |
| 2015/0365325 A1* | 12/2015 | Hwang | H04L 47/70 370/230 |
| 2016/0036723 A1* | 2/2016 | Hao | H04L 47/80 370/392 |
| 2017/0142000 A1* | 5/2017 | Cai | H04L 45/16 |
| 2017/0171039 A1* | 6/2017 | Su | H04L 43/04 |
| 2018/0083866 A1* | 3/2018 | Gobriel | H04L 45/38 |

\* cited by examiner

FLOW ROUTING SYSTEM

BACKGROUND

The present disclosure relates generally to information handling systems, and more particularly to more efficient flow routing by Software Defined Networking (SDN) information handling systems that route packets included in flows.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices, sometimes utilize Software Defined Networking (SDN) techniques in order to route network traffic. For example, SDN switches may operate with an SDN controller to define packets flows and route packets that are associated with those packet flows through a network. SDN techniques separate the control plane of the network (used to make decisions about how packets should flow through the network) from the data plane of the network (used to actually route packets through the network), and provide for dynamic, scalable computing and storage, while accelerating application deployment and delivery, and reducing Information Technology (IT) costs.

SDN techniques are often used in the provisioning of real-time services such as, for example, Voice over Internet Protocol (VoIP) and online gaming. For example, many online gaming applications send a relatively large number of User Datagram Protocol (UDP) or Transmission Control Protocol (TCP) packets from the client to the server (and vice versa), which can produce latency in the network. Such latency can be undesirable in online gaming (as well as in VoIP) because it can cause inconsistencies between the status of the virtual world observed by different users of the online gaming application. The size of such packets is typically in the tens of bytes in the client-to-server direction, as only the virtual world actions of the user of the client device are sent to the server, while such packets may be larger in the server-to-client direction, as they include information about the virtual world actions of the other users of other client devices. As such, relatively small sized client-to-server packet traffic flows like those seen online gaming applications (as well as the acknowledgements utilized in TCP communications) may result in the use of a relatively large amount of SDN switch processing bandwidth that is utilized to match packets to packet flows.

For example, the use of SDN techniques on such packet flows involves an SDN switch receiving a packet, accessing a flow table in a Ternary Content-Addressable Memory (TCAM), and determining if the packet header for that packet includes information that matches a flow table entry in the flow table. Conventional flow table entries include at least 12-tuples (e.g., the "Openflow 12-tuples") that identify an ingress port, a Source Media Access Control (MAC) address, a Destination MAC address, an Ethertype, a Virtual Local Area Network (VLAN) identity, a VLAN priority, a source Internet Protocol (IP) address, a destination IP address, an IP protocol, an IP Type of Service (ToS), a TCP/UDP source port, and a TCP/UDP destination port. Upon receiving the packet, the SDN switch operates to check each entry in the packet header of the packet against the 12-tuples in each flow entry in order to determine whether that packet matches an existing flow. Such conventional SDN techniques can require a relatively significant amount of time and power to perform. For example, recent studies of TCAM power use for a 100k entry TCAM in an SDN switch found a TCAM power consumption of 792,677 nJ for write/insert operations, and 1,807,142 nJ for search/lookup operations.

Accordingly, it would be desirable to provide an improved flow routing system.

SUMMARY

According to one embodiment, an Information Handling System (IHS) includes a communication subsystem that is configured to couple to a network; a processing system that is coupled to the communication subsystem; and a memory system that is coupled to the processing system and that included instructions that, when executed by the processing system, cause the processing system to provide a Software Defined Networking (SDN) flow routing engine that is configured to: receive, through the network via the communication subsystem, a first packet from a source device; identify a connection identifier that is included in a first packet header of the first packet; match the connection identifier to a single tuple in a flow entry of a flow table; and use the flow entry to route the first packet through the network via the communication subsystem and to the destination device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
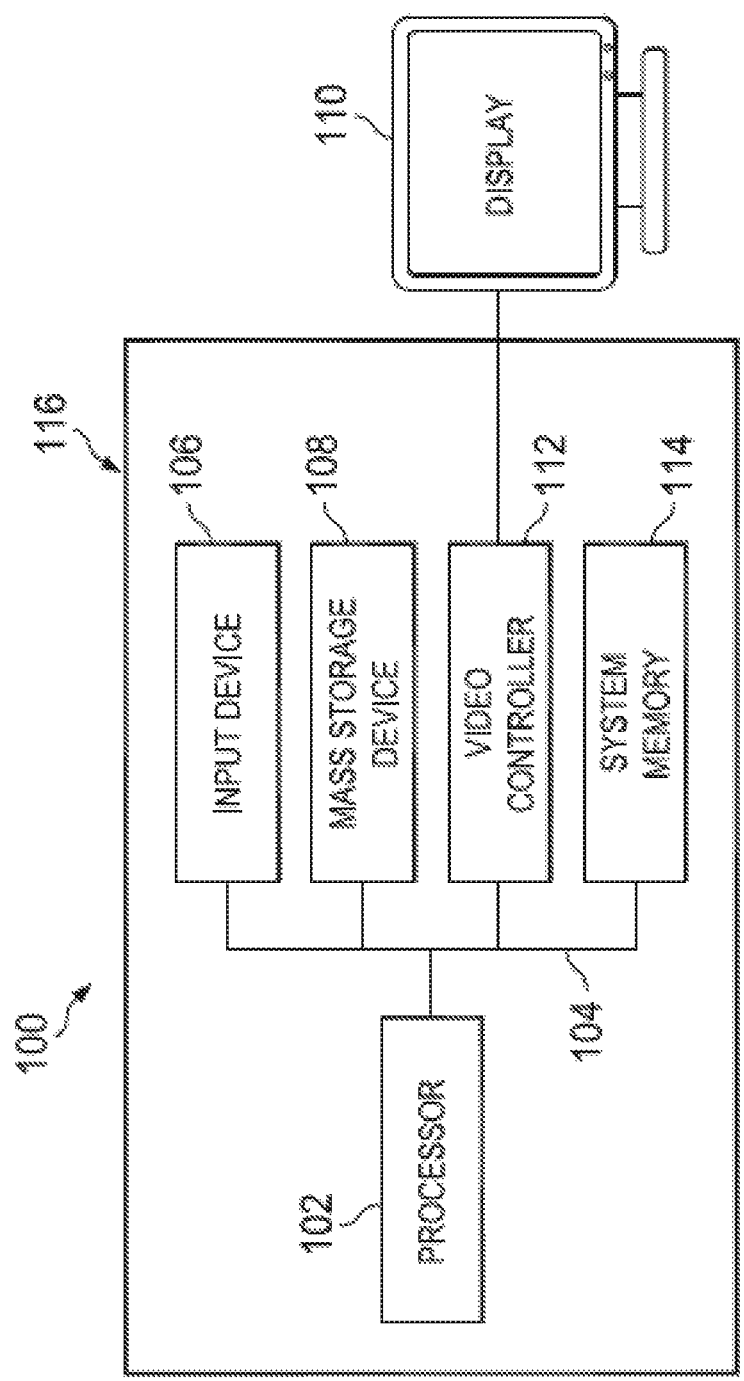
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
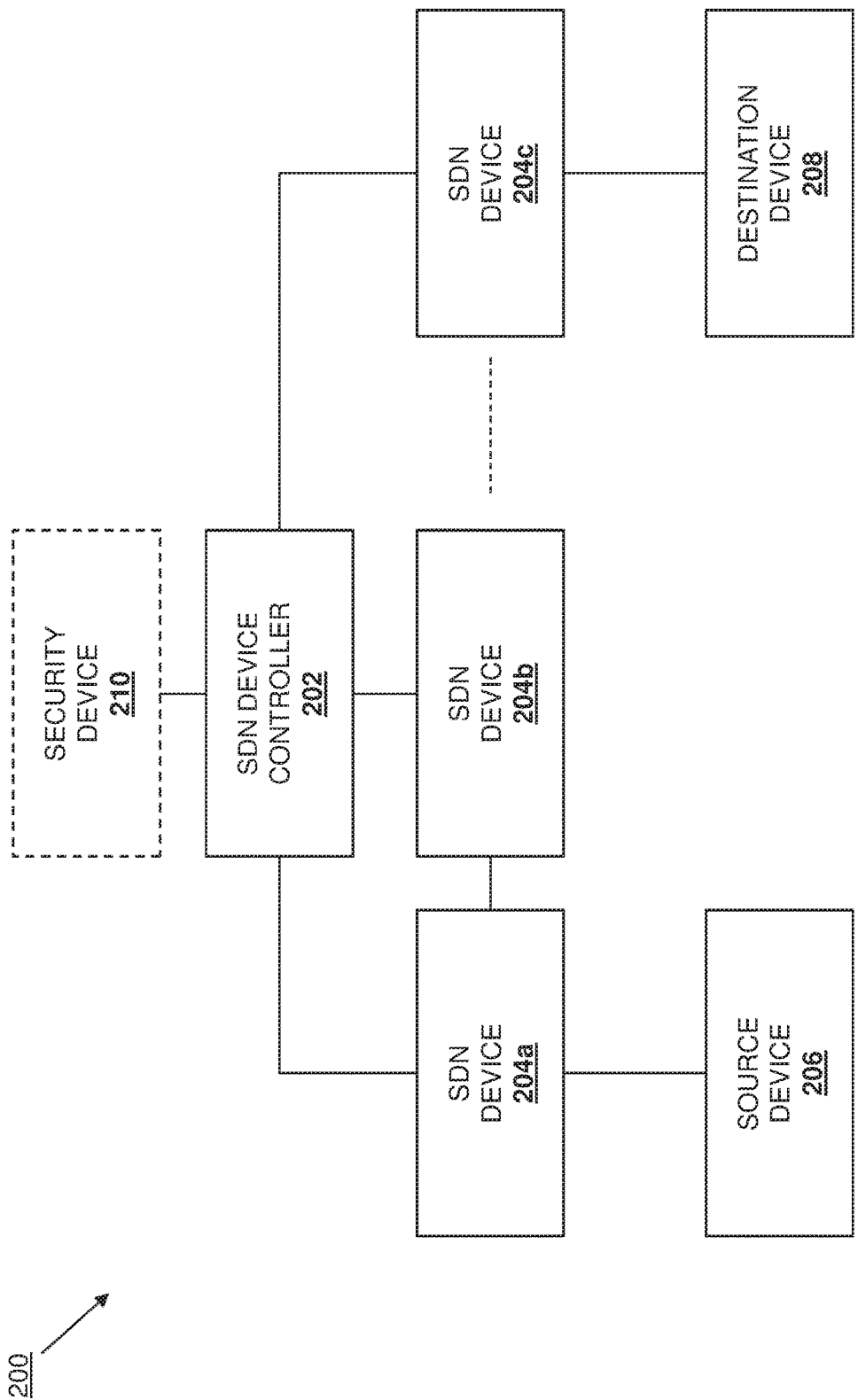
FIG. 2 is a schematic view illustrating an embodiment of a flow routing system.

Referring now to FIG. 2, an embodiment of a flow routing system 200 is illustrated. In the illustrated embodiment, the flow routing system 200 includes a Software Defined Networking (SDN) device controller 202 that may be the IHS 100 discussed above with reference to FIG. 1 and/or may include some or all of the components of the IHS 100. The SDN device controller 202 is coupled to one or more SDN devices that, in the illustrated embodiment, include the SDN device 204*a*, the SDN device 204*b*, and up to the SDN device 204*c*, each of which may be coupled to each other directly (e.g., via a direct wired or connection) or indirectly (e.g., through at least one other SDN device). Any or all of the SDN devices 204*a-c* may be the IHS 100 discussed above with reference to FIG. 1 and/or may include some or all of the components of the IHS 100. In a specific example, the SDN device controller 202 may be provided on a management system and coupled through a management network to each of a plurality of SDN switches or routers that provide the SDN devices 204*a-c* that are coupled together to provide an SDN network. However, one of skill in the art in possession of the present disclosure will recognize that other SDN configurations using other types of SDN devices will benefit from the teachings of the present disclosure and thus fall within its scope as well.

In an embodiment, each of the SDN device controller 202 and the SDN devices 204*a*—may operate according to the OPENFLOW® protocol, which provides access to the forwarding plane on networking devices such as the SDN devices 204*a-c*, and enables SDN controllers such as the SDN device controller 202 to determine the path of packets across the network that includes the networking devices. For example, the OPENFLOW® protocol allows remote administration of a layer 3 networking devices packet forwarding tables (also referred to as "flow tables") by adding, modifying and removing packet matching rules and actions (also referred to as "flow entries"). This allows routing decisions to be made periodically or ad hoc by the SDN controller, and translated into flow entries with a configurable lifespan, which are then deployed to a networking devices flow table, leaving the actual forwarding of flow-entry-matched packets by the networking device at wire speed for the duration of those flow entries. As would be appreciated by one of skill in the art, this separation of the control plane from the forwarding plane allows for more sophisticated traffic management than is feasible using conventional networking features such as access control lists (ACLs) and routing protocols. Furthermore, the OPENFLOW® protocol allows for the remote management of networking devices from different manufacturers via a single protocol. However, while the OPENFLOW® protocol has been described in detail, one of skill in the art in possession of the present disclosure will recognize that other SDN protocols may fall within the scope of the present disclosure as well.

In the illustrated embodiment, the flow routing system 200 also includes a source device 206 that is coupled to the SDN device 204*a*, and that may be the IHS 100 discussed above with reference to FIG. 1 and/or may include some or all of the components of the IHS 100. For example, in different embodiments, the source device 206 may be a desktop computer, a laptop computer, a tablet computer, a mobile phone, a server, and/or a variety of other sources devices known in the art. In the illustrated embodiment, the flow routing system 200 also includes a destination device 208 that is coupled to the SDN device 204*c*, and that may be the IHS 100 discussed above with reference to FIG. 1 and/or may include some or all of the components of the IHS 100. For example, in different embodiments, the destination device 208 may be a desktop computer, a laptop computer, a tablet computer, a mobile phone, a server, and/or a variety of other destination devices known in the art. While in the examples below, the flow routing system 200 is described as routing packets sent from the source device 206 to the destination device 208, one of skill in the art will recognize that packets may be routed back and forth between any two devices in a network, and thus the destination device 208 may become a "source" device, while the source device 206 may become a "destination" device, when the communications discussed below are reversed.

In the illustrated embodiment, the flow routing system 200 also includes an optional security device 210 that may be the IHS 100 discussed above with reference to FIG. 1 and/or may include some or all of the components of the IHS 100. For example, the security device 210 may be provided in a "gateway" system that operates as discussed below to monitor packets sent to the flow routing system 200 to ensure that they do not violate security policies. Thus, while the security device 210 is illustrated as coupled to the SDN device controller 202, the security device may be provided between any device that sends packets to the network provided by the SDN devices 204a-c (e.g., between the source device 206 and the SDN device 204a) to ensure that packets entering that network do not violate security policies. However, other subsystems and/or security techniques may replace the security device 210 while remaining within the scope of the present disclosure. While a specific flow routing system 200 has been described, one of skill in the art in possession of the present disclosure will recognize that a variety of additional and/or different device and device configurations other than those illustrated may be utilized in the flow routing system while remaining within the scope of the present disclosure.

Figure 3:
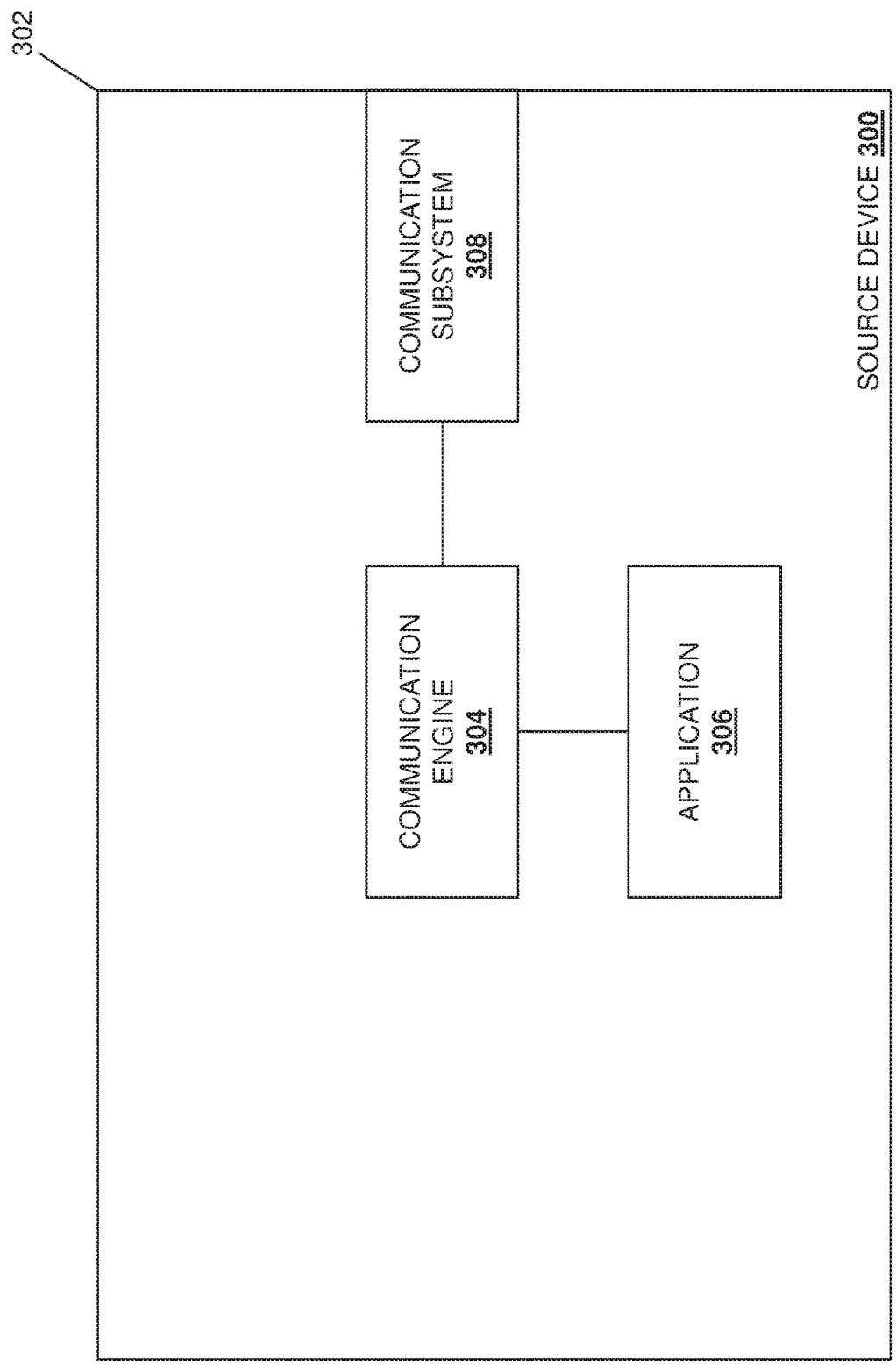
FIG. 3 is a schematic view illustrating an embodiment of a source device used in the flow routing system of FIG. 2.

Referring now to FIG. 3, an embodiment of a source device 300 is illustrated that may be the source device 206 discussed above with reference to FIG. 2. As such, the source device 300 may be the IHS 100 discussed above with reference to FIG. 1 and/or may include some or all of the components of the IHS 100, and in specific examples may be a desktop computer, a laptop computer, a tablet computer, a mobile phone, a server, and/or other source devices known in the art. In the illustrated embodiment, the source device 300 includes a chassis 302 that houses the components of the source device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a communication engine 304 that is configured to perform the functionality of the communication engines and source devices discussed below. In addition, the memory system may instructions that, when executed by the processing system, cause the processing system to provide an application 306 that is configured to perform the functionality of the applications and source devices discussed below. In a specific example, the application 306 may be a VoIP application or an online gaming application. However, a variety of other applications will benefit from the teachings of the present disclosure and thus are envisioned as falling within its scope as well. As illustrated, the communication engine 304 and the application 306 may be coupled together (e.g., via software enabled communication links) to provide communication between the two.

The chassis 302 may also house a communication subsystem that is coupled to the communication engine 304 (e.g., via a coupling between the communication subsystem and the processing system) and that may include a Network Interface Controller (NIC), a wireless communication subsystem (e.g., BLUETOOTH®), and/or a variety of other communication subsystems known in the art. While a specific source device 300 has been illustrated and described, one of skill in the art in possession of the present disclosure will recognize that the source device 300 may include a variety of components other than those that are illustrated that are configured to perform conventional source device functionality, as well as the functionality discussed below, while remaining within the scope of the present disclosure.

Figure 4:
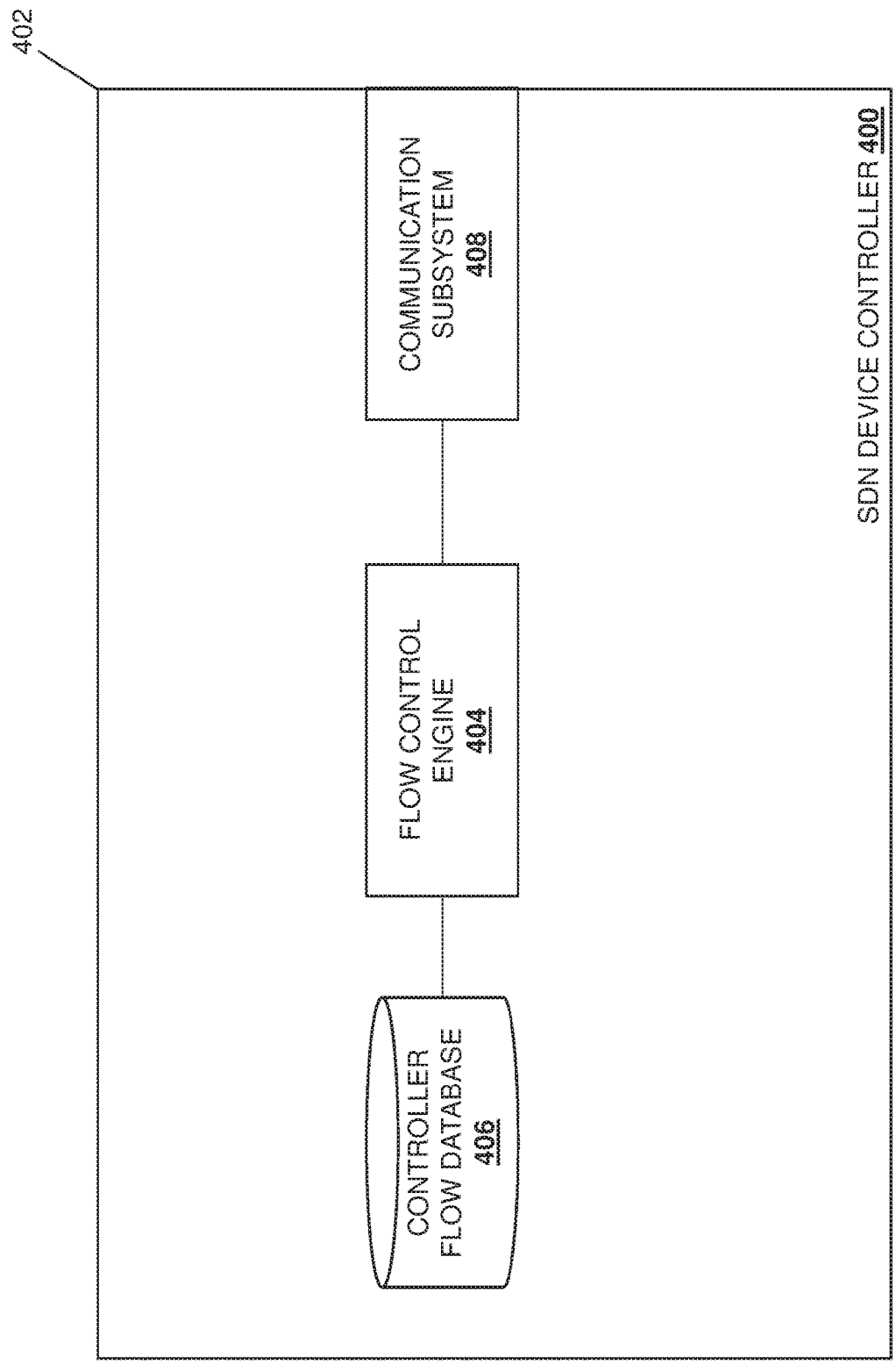
FIG. 4 is a schematic view illustrating an embodiment of an SDN device controller used in the flow routing system of FIG. 2.

Referring now to FIG. 4, an embodiment of an SDN device controller 400 is illustrated that may be the SND device controller 202 discussed above with reference to FIG. 2. As such, the SDN device controller 400 may be the IHS 100 discussed above with reference to FIG. 1 and/or may include some or all of the components of the IHS 100, and in specific examples may be a networking device, a server device, and/or other SDN device controllers known in the art. In the illustrated embodiment, the SDN device controller 400 includes a chassis 402 that houses the components of the SDN device controller 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a flow control engine 404 that is configured to perform the functionality of the flow control engines and SDN device controllers discussed below. The chassis 402 may also house a storage system (not illustrated, but which may include the storage device 108 discussed above with reference to FIG. 1) that is coupled to the flow control engine 404 (e.g., via a coupling between the storage system and the processing system), and that includes a controller flow database 406 that is configured to store the information discussed below.

The chassis 402 may also house a communication subsystem that is coupled to the flow control engine 404 (e.g., via a coupling between the communication subsystem and the processing system) and that may include a Network Interface Controller (NIC), a wireless communication subsystem (e.g., BLUETOOTH®), and/or a variety of other communication subsystems known in the art. While a specific SDN device controller 400 has been illustrated and described, one of skill in the art in possession of the present disclosure will recognize that the SDN device controller 400 may include a variety of components other than those that are illustrated that are configured to perform conventional SDN device controller functionality, as well as the functionality discussed below, while remaining within the scope of the present disclosure.

Figure 5:
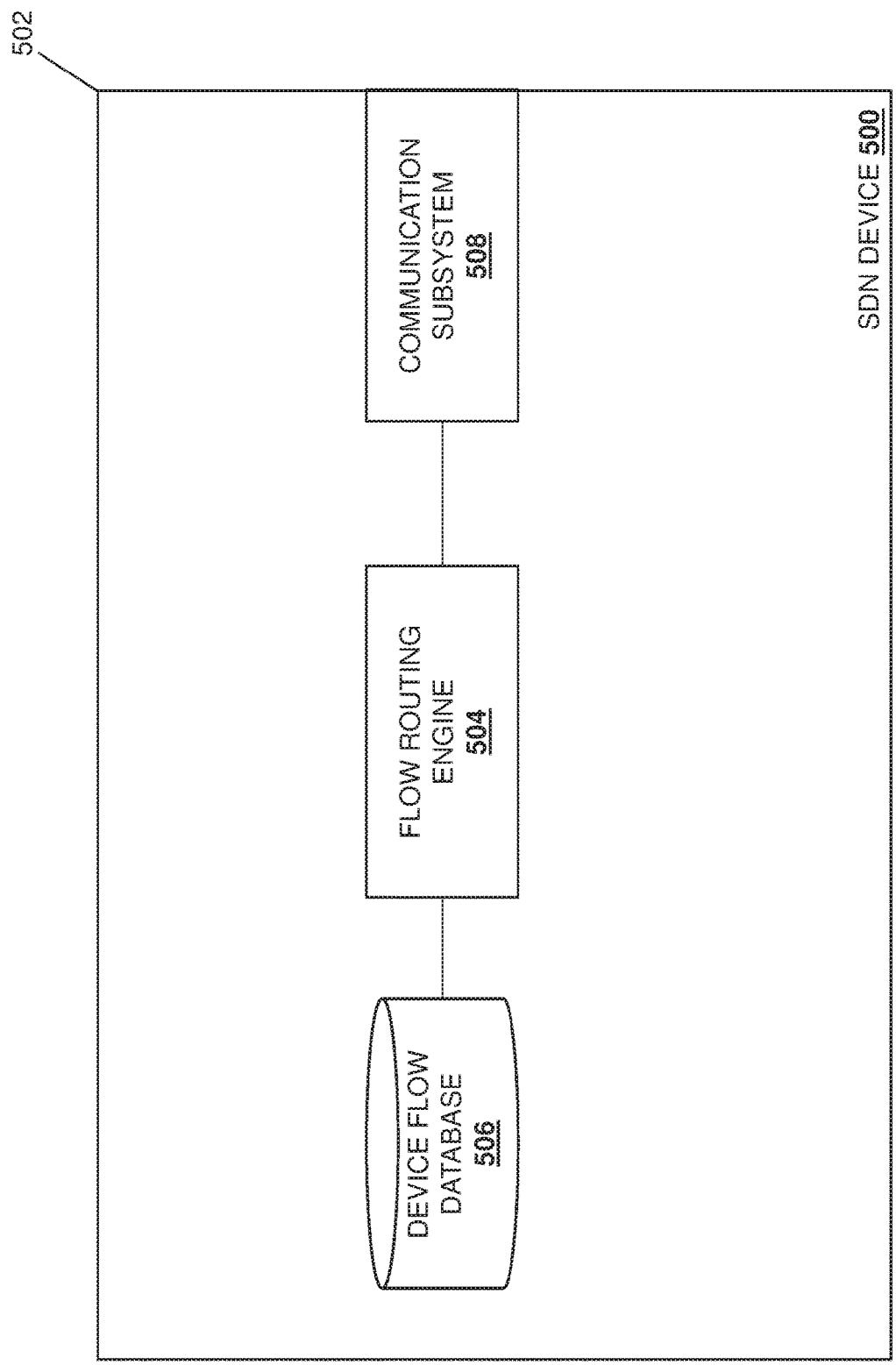
FIG. 5 is a schematic view illustrating an embodiment of an SDN device used in the flow routing system of FIG. 2.

Referring now to FIG. 5, an embodiment of an SDN device 500 is illustrated that may be any or all of the SND devices 204a-c discussed above with reference to FIG. 2. As such, the SDN device 500 may be the IHS 100 discussed above with reference to FIG. 1 and/or may include some or all of the components of the IHS 100, and in specific examples may be a networking device such as a switch, a router, and/or other SDN devices known in the art. In the illustrated embodiment, the SDN device 500 includes a chassis 502 that houses the components of the SDN device 500, only some of which are illustrated in FIG. 5. For example, the chassis 502 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a flow routing engine 504 that is configured to perform the functionality of the flow routing engines and SDN devices discussed below. The chassis 502 may also house a storage system (not illustrated, but which may include the storage device 108 discussed above with reference to FIG. 1) that is coupled to the flow routing engine 504 (e.g., via a coupling between the storage system and the processing system), and that includes a device flow database 506 that is configured to store the information discussed below.

The chassis 502 may also house a communication subsystem that is coupled to the flow routing engine 504 (e.g., via a coupling between the communication subsystem and the processing system) and that may include a Network Interface Controller (NIC), a wireless communication subsystem (e.g., BLUETOOTH®), and/or a variety of other communication subsystems known in the art. While a specific SDN device 500 has been illustrated and described, one of skill in the art in possession of the present disclosure will recognize that the SDN device 500 may include a variety of components other than those that are illustrated that are configured to perform conventional SDN device functionality, as well as the functionality discussed below, while remaining within the scope of the present disclosure.

Figure 6:
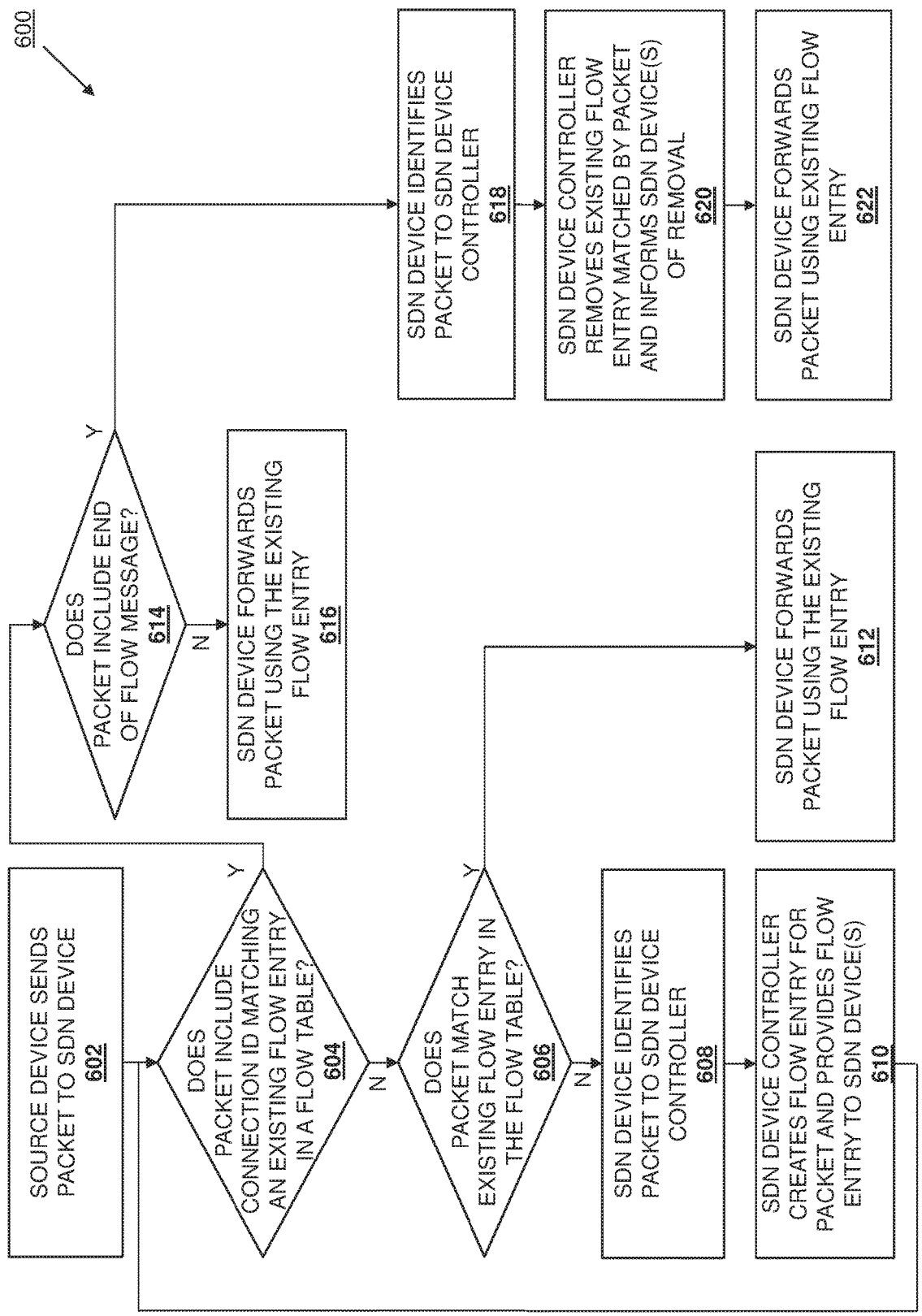
FIG. 6 is a flow chart illustrating an embodiment of a method for routing flows.

Referring now to FIG. 6, an embodiment of a method 600 for flow routing is illustrated. As discussed below, the systems and methods of the present disclosure reduce the time needed to route packets that are part of a flow, while reducing the processing power associated with routing those packets, by utilizing a connection identifier in a single tuple in a flow entry of a flow table, and then routing packets that include that connection identifier in their packet headers based on a match to that single tuple in the flow entry of the flow table. The connection identifier may be created by a source device by hashing information that is unique to a particular connection between the source device and a destination device, and then included in the packet header for a first packet of a flow. An SDN device receiving that first packet will identify that first packet to the SDN device controller, and the SDN device controller will then create a flow entry for the flow that includes the connection identifier in one of the tuples of the flow entry, and provide that flow entry to the SDN device(s) in the network. The source device will then provide the connection identifier in each of the remaining packets in the flow, and SDN devices receiving those packets will match them to the flow entry in their flow tables by matching the connection identifier in the packet header of the packet to the connection identifier in one of the tuples in the flow entry, and then forward the packet as defined by the matched flow entry. As such, packets may be forwarded based on the match of a connection identifier in their packet headers to a single tuple in a flow entry, rather than based on the match of 12 (or more) data elements in the packet header to 12 (or more) tuples in the flow entry, increasing the speed at which packets are forwarded, and reducing the power needed to forward them.

The method 600 begins at block 602 where a source device sends a packet to an SDN device. In an embodiment, at block 602, the application 306 in the source device 206/300 may operate to generate data for transmittal through a network (e.g., the network in the flow routing system 200 provided by the SDN devices 204a-c) to the destination device 208. For example, the data generated at block 602 may include VoIP data, data associated with an online gaming application, and/or data for a variety of other applications known in the art. At block 602, the application 306 may provide the data that is generated to the communication engine 304, and the communication engine 304 may operate to generate packets for transmittal through the network (e.g., the network provided by the SDN devices 204a-c in the flow routing system 200) to the destination device 208. In an embodiment, at block 602, the communication engine 304 may operate to format packets of the data received from the application 306 to each include portions of that data along with control information that is included in a packet header of that packet. For example, the formatting of the packets at block 602 may be performed during the 3-way handshake/initialization that provides the initial connection between the source device 206 and the destination device 208.

For example, the communication engine 304 may format each packet to include a packet header with control information that identifies an ingress port for the packet to the network (e.g., a port on the SDN device 204a), a Source Media Access Control (MAC) address of the source device 206, a Destination MAC address of the destination device 208, an Ethertype of the packet, a Virtual Local Area Network (VLAN) identity of a VLAN that the packet is being sent on, a VLAN priority of the VLAN that the packet is being sent on, a source Internet Protocol (IP) address of the source device 206, an destination IP address of the destination device 208, an IP protocol being used to send the packet, an IP Type of Service (ToS) for the packet, a TCP/UDP source port for the source device 206, and a TCP/UDP destination port for the destination device 208. As discussed below, one of skill in the art in possession of the present disclosure will recognize that the control information identified above corresponds to information provided in the 12 tupals of conventional flow entries of flow tables (e.g., the "Openflow 12-tuples"). However, at block 602, the communication engine 304 may format each packet to include the packet header with other conventional control information known such as an IP protocol type, a VLAN priority, and/or other control information (e.g., in addition to the Openflow 12-tuples) while remaining within the scope of the present disclosure.

In addition to the conventional control information included in the packet header of each packet, at block 602, the communication engine 304 may format each packet to include the packet header with non-conventional control information that is referred to herein as a "connection identifier" that is unique to a particular connection between the source device 206 and the destination device 208. In an embodiment, at block 602, the communication engine 304 may perform a hashing operation on a combination of the conventional control information, as well as information that is not included in the conventional control information, discussed above. For example, the communication engine 304 may generate the connection identifier by performing a hash operation on a source IP address of the source device 206, a destination IP address of the destination device, a VLAN identity of a VLAN the packet is being sent on, a source MAC address of the source device 206, a destination MAC address of the destination device 205, a source port identifier of a port on the source device 206, a destination port identifier of a port on the destination device 208, and a creation time for the flow that includes the packet (e.g., a time that the first packet (for the flow that includes the current packet that is being created) was created).

In another example, the communication engine 304 may generate the connection identifier by performing a hash operation on the information detailed immediately above, as well as additional conventional control information provided in the packet header. In yet another example, the communication engine 304 may generate the connection identifier by performing a hash operation on all of the conventional control information provided in the packet header (e.g., the information provided in the 12 tupals of conventional flow entries of flow tables, as well as any additional conventional control information, if present) along with the creation time for the flow that includes the packet. However, while several example of generating the connection identifier have been discussed, one of skill in the art in possession of the present disclosure will recognize that other information and/or different combinations of information may be utilized to provide a connection identifier that is unique to the connection between the source device 206 and the destination device 208 while remaining within the scope of the present disclosure.

In an embodiment, at block 602, the communication engine 304 may provide the connection identifier in an identification field of the packet header. One of skill in the art in possession of the present disclosure will recognize that the identification field of packet headers is conventionally utilized with fragmented packets. However, in some embodiments of the present disclosure, the identification field may be repurposed for use in the present disclosure when packet fragmentation is not employed. Furthermore, as router/switch level fragmentation is discouraged in most modern systems (e.g., while Path Maximum Transmission Unit Discovery (PMTUD) operates to size packets at the source appropriately to ensure delivery), such repurposing is expected to be applicable to the vast majority of scenarios. Further still, the identification field provides a 16 bit field that can accommodate 65,000 unique identifiers, which may be sufficient for many embodiments of the present disclosure. However, in situations where the identification field of the packet header does not provide a sufficient number of unique identifiers, the communication engine 304 may also utilize a fragment offset field of the packet header (which will also be free when packet fragmentation is not employed) to provide the connection identifier. However, while fields in the packet header that are free when packets are not fragmented have been discussed as being utilized to store the connection identifier, one of skill in the art in possession of the present disclosure will recognize that other packet header field(s) may hold the connection identifier while remaining within the scope of the present disclosure.

As such, at block 602, packets may be generated with packet headers that include at least the conventional control information utilized to provide the 12 tupals of conventional flow entries of flow tables, along with the connection identifier. As discussed below, when the communication engine 304 receives data from the application 306 that corresponds to a new flow (e.g., a new connection to the destination device 208), the communication engine 304 may operate to create a first packet, generate the connection identifier, and provide that connection identifier in that first packet. For subsequent packets that are part of that same flow, the communication engine 304 may either regenerate that connection identifier (which will be the same for any particular flow/connection to the destination device 208) and provide it in the packet header for that subsequent packet, or retrieve the connection identifier generated for the first packet and provide it in the packet header for that subsequent packet. Following the generation of each packet in the flow, at block 602 the communication engine 304 sends that packet through the communication subsystem 308 and to the SDN device 204a.

As discussed above, in some embodiments, the security device 210 may be provided as a gateway device to the network provided by the SDN devices 204a. As such, at block 602, the packet sent by the source device 206 may be received by the security device 210 (e.g., directly if the security device 210 is located between the source device 206 and the SDN device 204a; or indirectly if the SDN device 204a receives the packet from the source device 206, determines that the packet doesn't match an existing flow, and forwards that packet through the SDN controller 202 to the security device 210). Upon receiving the packet, the security device 210 may operate to determine whether the packet violates a security policy. If the packet violates a security policy, the security device 210 may discard the packet such that the packet does not enter the network provided by the SDN devices 204a-c. However, if the packet does not violate a security policy, the security device 210 may provide an indication that the packet is secure (e.g., by allowing that packet to enter the network via the SDN device 204a; or by providing an indication to the SDN device controller 202 that the packet is secure such that the SDN device controller 202 may create a flow entry as discussed below with regard to block 610). While some specific security device functionality has been described, one of skill in the art in possession of the present disclosure will recognize that a variety of security functionality may be implemented in the flow routing system 200 to ensure that packets received and forwarded through the network by the SDN devices 204a-c are secure while remaining within the scope of the present disclosure.

The method 600 then proceeds to decision block 604 where it is determined whether the packet includes a connection identifier matching an existing flow entry in a flow table. In an embodiment, in response to the source device 206 sending the packet at block 602, the flow routing engine 504 in the SDN device 204a/500 receives that packet through its communication subsystem 508. At decision block 604, the flow routing engine 504 then operates to determine whether that packet includes a connection identifier that matches an existing entry in a flow table. As discussed in further detail below, the device flow database 506 in the SDN device 204a/500 may include a flow table with flow entries that are determined by the SDN device controller 202. As such, at decision block 604, the flow routing engine 504 in the SDN device 204a/500 may check the packet header of the packet to determine whether that packet header includes a connection identifier and, if so, to determine whether that connection identifier matches an existing flow entry in a flow table in the device flow database 506.

If, at decision block 604, it is determined that that packet does not include a connection identifier that matches an existing flow entry in the flow table, the method 600 then proceeds to decision block 606 where it is determined whether the packet matches an existing flow entry in the flow table. In an embodiment, at decision block 604, the flow routing engine 504 in the SDN device 204a/500 may determine that the packet header of the packet does not include a connection identifier (e.g., that packet may be received from a source device that does not participate in the method 600 and thus only includes conventional control information in its packet header), or that a connection identifier included in the packet header of the packet does not match an existing flow entry in a flow table in the device flow database 506. In response, at decision block 606, the flow routing engine 504 in the SDN device 204a/500 may check the packet header of the packet to determine whether that packet header includes conventional control information that matches an existing flow entry in a flow table in the device flow database 506.

For example, at decision block 606, the flow routing engine 504 in the SDN device 204a/500 may compare the conventional control information in the packet header that identifies the ingress port for the packet, the Source MAC address of the source device 206, the Destination MAC address of the destination device 208, the Ethertype of the packet, the VLAN identity of the VLAN that the packet is being sent on, the VLAN priority of the VLAN that the packet is being sent on, the source IP address of the source device 206, the destination IP address of the destination device 208, the IP protocol being used to send the packet, the IP Type of Service (ToS) for the packet, the TCP/UDP source port for the source device 206, and the TCP/UDP destination port for the destination device 208, to each of the 12 tuples of each of the flow entries in the flow table in the device flow database 506 to determine whether that conventional control information matches any of those flow entries.

If, at decision block 606, it is determined that that packet does not match an existing flow entry in the flow table, the method 600 then proceeds to block 608 where the SDN device identifies the packet to an SDN controller. In an embodiment, at block 606, the flow routing engine 504 in the SDN device 204a/500 may determine that the conventional control information in the packet header (detailed above) does not match each of the 12 tuples of any of the flow entries in the flow table in the device flow database 506 and, in response, may operate to identify the packet to the SDN controller device 202. One of skill in the art in possession of the present disclosure will recognize that the receipt of a packet that does not match an existing flow entry in a flow table may correspond to packet that is part of a new flow (e.g., a first packet of a newly created flow from the source device 206). As such, upon receiving a packet that does not match an existing flow entry in its flow table in the device flow database 506, the flow routing engine 504 in the SDN device 204a/500 may identify that packet to the SDN device controller 202 so that the SDN device controller 202 can create a new flow entry that identifies the flow and defines how packets in that flow should be routed. In some embodiments, identification of the packet to the SDN device controller 202 may include the flow routing engine 504 in the SDN device 204a/500 forwarding that packet through its communication subsystem 508 and to the SDN device controller 202. In other embodiments, identification of the packet to the SDN device controller 202 may include the flow routing engine 504 in the SDN device 204a/500 sending identification information about that packet through its communication subsystem 508 and to the SDN device controller 202.

The method 600 then proceeds to block 610 where the SDN device controller creates a flow entry for the packet and provides the flow entry to the SDN device(s). In an embodiment, at block 610, the flow control engine 404 in the SDN device controller 202/400 may receive the identification of the packet from the SDN device 204a (e.g., the forwarded packet or the identification information) via its communication subsystem 408 and, in response, create a flow entry for the packet and provide the flow entry to the SDN device(s). For example, at block 610, the flow control engine 404 in the SDN device controller 202/400 may utilize the information in the packet header of the packet to create the flow entry. In examples where the packet includes the conventional control information along with the connection identifier, the flow control engine 404 in the SDN device controller 202/400 may use the conventional control information to create at least the 12 tuples of the flow entry (the ingress port for the packet, the Source MAC address of the source device 206, the Destination MAC address of the destination device 208, the Ethertype of the packet, the VLAN identity of the VLAN that the packet is being sent on, the VLAN priority of the VLAN that the packet is being sent on, the source IP address of the source device 206, the destination IP address of the destination device 208, the IP protocol being used to send the packet, the IP Type of Service (ToS) for the packet, the TCP/UDP source port for the source device 206, and the TCP/UDP destination port for the destination device 208), and use the connection identifier to provide an additional, single tuple in that flow entry. The table below illustrates an example of such a flow entry:

| INGRESS PORT | ETHER SOURCE | ETHER DEST | ETHER TYPE | VLAN ID | VLAN PRIORITY | SOURCE IP | DEST IP | IP PROTOCOL | IP TOS BITS | TCP/UDP SOURCE PORT | TCP/UDP DEST PORT | CONN ID |
|---|---|---|---|---|---|---|---|---|---|---|---|---|

In examples where the packet includes the conventional control information without the connection identifier, the flow control engine 404 in the SDN device controller 202/400 may use the conventional control information to create at least the 12 tuples of the flow entry (e.g., the information in the table above but without the connection identifier.) Following the creation of the flow entry, at block 610 the flow control engine 404 in the SDN device controller 202/400 may store that flow entry in a flow table in the controller flow database 406, and provide that flow entry to each of the SDN devices 204a-c through its communication subsystem 408. In embodiments in which the packet was forwarded to the SDN device controller 202, that packet may be forwarded back to the SDN device from which it was received (e.g., the SDN device 204a in this example). In response to receiving the flow entry created by the SDN device controller 202 (e.g., through their communication subsystems 508) the flow routing engine 504 in each SDN device 204a-c/500 may store that flow entry in its flow table in its device flow database 506. Following block 610, the method 600 then returns to decision block 604, discussed above.

Returning to decision block 606, if it is determined that the packet matches an existing flow entry in the flow table, the method 600 then proceeds to block 612 where the SDN device forwards the packet using the existing flow entry. In an embodiment, at decision block 606, the flow routing engine 504 in the SDN device 204a/500 may determine that the packet (which was determined to not include a connection identifier, or to include a connection identifier that didn't match an existing flow entry in the flow table at decision block 604) matches an existing flow entry in the flow table in the device flow database 506. For example, the flow routing engine 504 in the SDN device 204a/500 may determine that the conventional control information in the packet header of the packet (detailed above) matches each of the 12 tuples of an existing flow entry in the flow table in the device flow database 506 and, in response, forward that packet using that existing flow entry. One of skill in the art in possession of the present disclosure will recognize that flow entries in a flow table may be associated with actions that are to be performed on packets that match those flow entries, and at block 612 the flow routing engine 504 in the SDN device 204a/500 may use the actions associated with the matched existing flow entry to forward that packet to an egress port and through the network (via its communication subsystem 508) towards the destination device 208. Furthermore, while the discussions above focus on the SDN device 204a forwarding packets based on conventional control information in their packet headers matching at least 12 tuples in a flow entry in its flow table, one of skill in the art in possession of the present disclosure will recognize that any of the SDN devices 204b-c may perform similar operations on a packet as well. As such, packets provided without using the teachings of the present disclosure (e.g., without a connection identifier in their packet headers) may still be routed through the network to destination devices. Furthermore, SDN devices not utilizing the teachings of the present disclosure (e.g., unable to route packets based on a connection identifier included in the packet header) may still forward packets using conventional 12-tuple flow routing techniques.

Returning to decision block 604, if it is determined that that packet includes a connection identifier that matches an existing flow entry in the flow table, the method 600 then proceeds to decision block 614 where it is determined whether the packet includes an end-of-flow message. In an embodiment, at decision block 604, the flow routing engine 504 in the SDN device 500 may determine that the packet header of the packet includes a connection identifier that matches a connection identifier in a flow entry of a flow table in the device flow database 506 and, in response, proceed to decision block 614 where is determines whether the packet include an end-of-flow message. For example, when the communication engine 304 determines that the flow should end (e.g., the application 306 is finished, or at least temporarily finished, generating data for transmittal to the destination device 208 as part of the previously created flow), the communication engine may generate a final packet for the flow, provide a FIN message in the packet header of that packet, and transmit that packet to the SDN device 204a via its communication subsystem 308. As such, at decision block 614, the flow routing engine 504 in the SDN device 500 may check the packet header of the packet to determine whether that packet header includes the FIN message. However, while a specific example of determinations of an end of a flow have been discussed, one of skill in the art in possession of the present disclosure will recognize that other techniques for determining the end of a flow will fall within the scope of the present disclosure.

If, at decision block 614, it is determined that that packet does not include an end-of-flow message, the method 600 then proceeds to block 616 where the SDN device forwards the packet using the existing flow entry. In an embodiment, at decision block 614, the flow routing engine 504 in the SDN device 500 may determine that the packet header of the packet does not include a FIN message and, in response, at block 616 the flow routing engine 504 in the SDN device 500 may utilize the existing flow entry that matched the connection identifier to forward that packet to an egress port and through the network (via its communication subsystem) towards the destination device 208. While the discussions above focus on the SDN device 204a forwarding packets based on the connection identifier in their packet headers matching a single tuple in a flow entry in its flow table, one of skill in the art in possession of the present disclosure will recognize that any of the SDN devices 204b-c may perform similar operations on a packet as well. As such, packets provided using the teachings of the present disclosure (e.g., with a connection identifier in their packet headers) may be routed through the network to destination devices based on a match with a single tuple in a flow entry, and because the source device 206 may provide the same connection identifier in the packet header of each packet of a particular flow, all the packets in any given flow may be routed via a match with a single tuple in a flow entry, thus vastly increasing the time needed to route those packets while reducing the processing power necessary to do so.

If, at decision block 614, it is determined that that packet includes an end-of-flow message, the method 600 then proceeds to block 618 where the SDN device identifies the packet to the SDN device controller. In an embodiment, the flow routing engine 504 in the SDN device 500 may determine that the packet header of the packet includes a FIN message and, in response, at block 618 the flow routing engine 504 in the SDN device 500 may identify the packet to the SDN device controller 202. One of skill in the art in possession of the present disclosure will recognize that a packet will include an end-of-flow message to indicate that an existing flow is ending. As such, upon receiving a packet that includes an end-of-flow message, the flow routing engine 504 in the SDN device 204a/500 may identify that packet to the SDN device controller 202 so that the SDN device controller 202 can remove the existing flow entry that identifies that flow. In some embodiments, identification of the packet to the SDN device controller 202 may include the flow routing engine 504 in the SDN device 204a/500 forwarding that packet through its communication subsystem 508 and to the SDN device controller 202. In other embodiments, identification of the packet to the SDN device controller 202 may include the flow routing engine 504 in the SDN device 204a/500 sending identification information about that packet through its communication subsystem 508 and to the SDN device controller 202.

The method 600 then proceeds to block 620 where the SDN device controller removes the existing flow entry that matched the packet and informs the SDN device(s) of the removal. In an embodiment, at block 620, the flow control engine 404 in the SDN device controller 202/400 may receive the identification of the packet from the SDN device 204a (e.g., the forwarded packet or the identification information) via its communication subsystem 408 and, in response, remove the existing flow entry for the packet and inform the SDN device(s) of the removal. For example, at block 610, the flow control engine 404 in the SDN device controller 202/400 may utilize the connection identifier to identify the flow entry for the flow that includes that packet, and remove that flow entry from a flow table in the controller flow database 406. As such, at block 602, each of the SDN devices 204a-c may be informed of the removal of the existing flow entry by the SDN device controller 202.

The method 600 then proceeds to block 622 where the SDN device forwards the packet using the existing flow entry. In an embodiment, at block 622 the flow routing engine 504 in the SDN device 500 may utilize the existing flow entry that matched the connection identifier to forward the packet to an egress port and through the network (via its communication subsystem 508) towards the destination device 208 substantially as described above. Following the forwarding of the final packet in the flow at block 622, each of the SDN devices 204a-204c may operate to remove the existing flow entry for that flow from the flow table in their device flow databases 506. Furthermore, while not explicitly described above, existing flow entries that utilize only conventional control information (rather than the connection identifiers described herein) may be removed from flow tables in a similar manner.

Thus, systems and methods have been described that provide for the reduction in the time needed to route packets that are part of a flow, as well as the processing power associated with routing those packets, via a connection identifier in a single tuple of a flow entry in a flow table that is used to match that flow entry with packets that include the connection identifier in their packet headers. The connection identifier is unique to a particular connection between the source device and a destination device such that SDN devices receiving those packets will quickly and easily match them to the flow entry in their flow tables via the single tuple in the flow entry that stores the connection identifier, and then forward the packet as defined by the matched flow entry, thus improving on the time and processing power necessary for conventional flow routing systems to match 12 (or more) data elements in the packet header to 12 (or more) tuples in the flow entry.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A flow routing system, comprising:
  a network;
  a destination device that is coupled to the network;
  a source device that is coupled to the network and that is configured to:
    generate a first packet for transmittal through the network to the destination device, wherein the first packet includes a first packet header;
    provide a connection identifier in a first field of a plurality of fields provided by the first packet header of the first packet, wherein the connection identifier is generated from a hash of:
      control information that is provided in multiple fields of the plurality of fields; and
      a creation time for the flow that includes the first packet; and
    transmit the first packet through the network; and
  a Software Defined Networking (SDN) device that is included in the network between the source device and the destination device, wherein the SDN device is configured to:
    receive the first packet through the network from the source device; and
    match the connection identifier that is included in the first packet header of the first packet to a single tuple in a flow entry of a flow table and, in response to the matching, use the flow entry to route the first packet through the network and to the destination device.

2. The flow routing system of claim 1, further comprising:
  an SDN device controller that is coupled to the SDN device, wherein the SDN device is configured to:
    create the flow entry; and
    cause the flow entry to be added to the flow table.

3. The flow routing system of claim 1, further comprising:
  a security device that is configured to:
    receive the first packet from the source device; and
    determine that the first packet does not violate a security policy and, in response, provide the first packet to the SDN device.

4. The flow routing system of claim 1, further comprising:
  an SDN device controller that is coupled to the SDN device, wherein the SDN device is configured to:
    cause the flow entry to be removed from the flow table.

5. The flow routing system of claim 1, wherein the control information that is provided in the multiple fields of the plurality of fields includes:
  a source Internet Protocol (IP) address;
  a destination IP address;
  a Virtual Local Area Network (VLAN) identity;
  a source Media Access Control (MAC) address;
  a source port identifier; and
  a destination port identifier.

6. The flow routing system of claim 1, wherein the first field is at least one of:
  an identification field in the first packet header of the first packet; and
  a fragment offset field in the first packet header of the first packet.

7. The flow routing system of claim 1, wherein the SDN device is configured to:
  generate, subsequent to generating the first packet, a second packet for transmittal through the network to the destination device, wherein the second packet includes a second packet header;
  provide the connection identifier in the second packet header of the second packet; and
  transmit the second packet through the network; and
  wherein the SDN device is configured to:
    receive, subsequent to receiving the first packet, the second packet through the network from the source device; and
    match the connection identifier that is included in the second packet header of the second packet to the single tuple in the flow entry of the flow table and, in response, use the flow entry to route the second packet through the network and to the destination device.

8. An Information Handling System (IHS), comprising:
  a communication subsystem that is configured to couple to a network;
  a processing system that is coupled to the communication subsystem; and
  a memory system that is coupled to the processing system and that includes instructions that, when executed by the processing system, cause the processing system to provide a Software Defined Networking (SDN) flow routing engine that is configured to:
    receive, through the network via the communication subsystem, a first packet from a source device;
    identify a connection identifier that is included a first packet header of the first packet;
    match the connection identifier to a single tuple in a flow entry of a flow table;
    use the flow entry to route the first packet through the network via the communication subsystem and to a destination device;
    receive, subsequent to receiving the first packet, a second packet from the source device;
    determine that the second packet includes an end flow message;
    forward the second packet to an SDN device controller via the communication subsystem;
    receive, from the SDN device controller via the communication subsystem and subsequent to forwarding the second packet that includes the end flow message, an instruction to remove the flow entry from the flow table; and
    remove the flow entry from the flow table.

9. The IHS of claim 8, wherein the SDN flow routing engine is configured to:
  receive, prior to receiving the first packet, a third packet from the source device;
  determine that information that is included in a second packet header of the third packet does not match any flow entries in the flow table;

forward the third packet to the SDN device controller via the communication subsystem;

receive, from the SDN device controller via the communication subsystem subsequent to forwarding the third packet, the flow entry; and store, prior to receiving the first packet, the flow entry in the flow table.

10. The IHS of claim 8, wherein the connection identifier comprises a hash of:
   a source Internet Protocol (IP) address;
   a destination IP address;
   a Virtual Local Area Network (VLAN) identity;
   a source Media Access Control (MAC) address;
   a source port identifier;
   a destination port identifier; and
   a creation time for a flow that includes the first packet.

11. The IHS of claim 8, wherein the SDN flow routing engine is configured to identify the connection identifier in at least one of:
   an identification field in the first packet header of the first packet; and
   a fragment offset field in the first packet header of the first packet.

12. The IHS of claim 8, wherein the SDN flow routing engine is configured to:
   receive, through the network via the communication subsystem subsequent to receiving the first packet, a third packet from the source device;
   identify the connection identifier that is also included in a second packet header of the third packet;
   match, prior to removing the flow entry from the flow table, the connection identifier to the single tuple in the flow entry of the flow table; and
   use, prior to removing the flow entry from the flow table, the flow entry to route the third packet through the network via the communication subsystem and to the destination device.

13. A method for flow routing, comprising:
   receiving, by a Software Defined Networking (SDN) device through a network from a source device, a first packet;
   determining, by the SDN device, that information in a first packet header of the first packet does not match any flow entries in a flow table;
   providing, by the SDN device to a security device, the first packet;
   determining, by the security device, that the first packet does not violate a security policy and, in response, indicating to an SDN device controller that the first packet is secure, wherein the SDN device controller creates a flow entry and causes the flow entry to be added to the flow table in response to the indication that the first packet is secure;
   receiving, by the SDN device through the network from the source device via the security device, a second packet that was determined by the security device to not violate a security policy;
   identifying, by the SDN device, a connection identifier that is included in a second packet header of the second packet;
   matching, by the SDN device, the connection identifier to a single tuple in the flow entry of the flow table; and
   using, by the SDN device, the flow entry to route the second packet through the network and to a destination device.

14. The method of claim 13, further comprising:
   receiving, by the SDN device subsequent to receiving the second packet, a third packet from the source device;
   determining, by the SDN device, that the third packet includes an end flow message;
   forwarding, by the SDN device to the SDN device controller, the third packet; and
   causing, by the SDN device controller in response to receiving the third packet that includes the end flow message, the flow entry to be removed from the flow table.

15. The method of claim 13, wherein the connection identifier comprises a hash of:
   a source Internet Protocol (IP) address;
   a destination IP address;
   a Virtual Local Area Network (VLAN) identity;
   a source Media Access Control (MAC) address;
   a source port identifier;
   a destination port identifier; and
   a creation time for a flow that includes the first packet.

16. The method of claim 13, wherein the SDN device identifies the connection identifier in at least one of:
   an identification field in the first packet header of the second packet; and
   a fragment offset field in the first packet header of the second packet.

17. The method of claim 13, further comprising:
   receiving, by the SDN device through the network from the source device subsequent to receiving the second packet, a third packet;
   identifying, by the SDN device, the connection identifier that is also included in a second packet header of the third packet;
   matching, by the SDN device, the connection identifier to the single tuple in the flow entry of the flow table; and
   using, by the SDN device, the flow entry to route the third packet through the network and to the destination device.

* * * * *